US012698997B2

(12) United States Patent
Arensmeier et al.

(10) Patent No.: US 12,698,997 B2
(45) Date of Patent: Aug. 4, 2026

(54) SYSTEMS AND METHODS FOR TANK LEVEL MONITORING

(71) Applicant: Copeland Comfort Control LP, St. Louis, MO (US)

(72) Inventors: Jeffrey N. Arensmeier, Fenton, MO (US); Thomas P. Buescher, Webster Groves, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 418 days.

(21) Appl. No.: 17/455,603

(22) Filed: Nov. 18, 2021

(65) Prior Publication Data

US 2023/0152140 A1 May 18, 2023

(51) Int. Cl.
*G01F 23/24* (2006.01)
*G01F 23/80* (2022.01)

(52) U.S. Cl.
CPC ............ *G01F 23/248* (2013.01); *G01F 23/80* (2022.01)

(58) Field of Classification Search
CPC ....... G01F 23/248; G01F 23/246; G01F 23/22
See application file for complete search history.

(56) References Cited

U.S. PATENT DOCUMENTS 9,772,210 B1* 9/2017 Houghton ............... G01F 23/22
10,571,328 B2 2/2020 Moore et al.

2005/0126282 A1* 6/2005 Maatuk ................. G01F 23/246
73/295
2006/0144140 A1* 7/2006 Hache ..................... G01F 23/22
73/295
2007/0251960 A1* 11/2007 Al-Misfer ........... C01B 17/0243
374/E1.018
2019/0032958 A1* 1/2019 Ohse ..................... G01F 23/248

OTHER PUBLICATIONS

NexSens T-Node FR Thermistor String (2015), Fondriest, https://www.nexsens.com/products/sensors/water-quality/ts210 (Year: 2015).*
N. Al-Hoqani, S.-H. Yang, D. P. Fiadzeawu and R. J. Mcquillan, "In-Network On-Demand Query-Based Sensing System for Wireless Sensor Networks," 2017 IEEE Wireless Communications and Networking Conference (WCNC), San Francisco, CA, USA, 2017, pp. 1-6, doi: 10.1109/WCNC.2017.7925597. (Year: 2017).*

* cited by examiner

*Primary Examiner* — Catherine T. Rastovski
*Assistant Examiner* — Brian Butler Geiss
(74) *Attorney, Agent, or Firm* — Armstrong Teasdale LLP

(57) ABSTRACT

A system for externally monitoring a tank level is provided. The system includes a tank monitoring computer device and at least one sensor array. The at least one sensor array includes a plurality of sensors and a plurality of fasteners. The at least one sensor array is configured to be attached to a tank by the plurality of fasteners. The tank monitoring computer device is in communication with the at least one sensor array. The tank monitoring computer device is programmed to a) receive a plurality of sensor readings from the plurality of sensors associated with the at least one sensor array, b) calculate a first tank level using a first method, c) calculate a second tank level using a second method, d) compare the first tank level to the second tank level to determine a final tank level, and e) report the final tank level.

20 Claims, 11 Drawing Sheets

SYSTEMS AND METHODS FOR TANK LEVEL MONITORING

FIELD

The present disclosure relates to tank level monitoring and, more particularly, to a system and method for externally monitoring a liquid level in a tank.

BACKGROUND

Receiver tanks (also known as refrigerant accumulator tanks) in refrigerant systems have the potential to leak and/or malfunction. However, these tanks are certified pressure vessels and any modifications to the tank would require re-certification. Many existing systems for monitoring fluid levels in these tanks include radar systems, capacitive systems, acoustic systems, and/or float systems. These systems require additional fittings internal to the tank and thus need to be installed with a new tank and/or require expensive retrofitting to install. Retrofitting requires taking the system out of service for a few days as the tank is turned off, cut open, modified, reinspected, cleaned, purged, re-sealed, and refilled. This can be very expensive in both time out of service and the cost of the work being done. Furthermore, the tanks come in a variety of sizes. Accordingly, it would be desirable to have a system that allows for monitoring tank liquid levels without requiring modification to the tank itself and can be easily customizable for the tank size.

BRIEF SUMMARY

In one aspect, a system for externally monitoring a tank level includes a tank monitoring computer device and a sensor array. The sensor array includes sensors and fasteners. The sensor array is externally attached to a tank by the fasteners. The tank monitoring computer device is in communication with the sensor array. The tank monitoring computer device is programmed to receive sensor readings from the sensors associated with the sensor array. The sensor readings are reading temperatures of the tank at points along the exterior of the tank. The tank monitoring computer device is programmed to calculate a first tank level using a first method, and to calculate a second tank level using a second method. In addition, the tank monitoring computer device is programmed to compare the first tank level to the second tank level to determine a final tank level. The tank monitoring computer device is also programmed to report the final tank level to a remote computer device.

In another aspect, a tank monitoring computer device includes a processor in communication with a memory device. The tank monitoring computer device is in communication with a sensor array associated with sensors attached to a side of a tank. The processor is programmed to receive sensor readings from the sensors associated with the sensor array. The sensor readings are reading temperatures of the tank at points along the exterior of the tank. The processor is also programmed to calculate a first tank level using a first method, and to calculate a second tank level using a second method. In addition, the processor is programmed to compare the first tank level to the second tank level to determine a final tank level. Furthermore, the processor is programmed to report the final tank level to a remote computer device.

In another aspect, a method for externally monitoring a tank level is implemented by a tank monitoring computer device including a processor in communication with a memory device. The tank monitoring computer device is in communication with a sensor array associated with sensors externally attached to a side of a tank. The method includes receiving sensor readings from the sensors associated with the sensor array. The sensor readings are reading temperatures of the tank at points along the exterior of the tank. The method also includes calculating a first tank level using a first method and calculating a second tank level using a second method. In addition, the method includes comparing the first tank level to the second tank level to determine a final tank level. The method includes reporting the final tank level to a remote computer device.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods. It should be understood that each Figure depicts an embodiment of a particular aspect of the disclosed systems and methods, and that each of the Figures is in accord with an embodiment. The following description refers to the reference numerals included in the following Figures, in which features depicted in multiple Figures are designated with consistent reference numerals.

The Figures depict preferred embodiments for purposes of illustration only. One skilled in the art will readily recognize from the following discussion that alternative embodiments of the systems and methods illustrated herein may be employed without departing from the disclosure.

DETAILED DESCRIPTION

Figure 1:
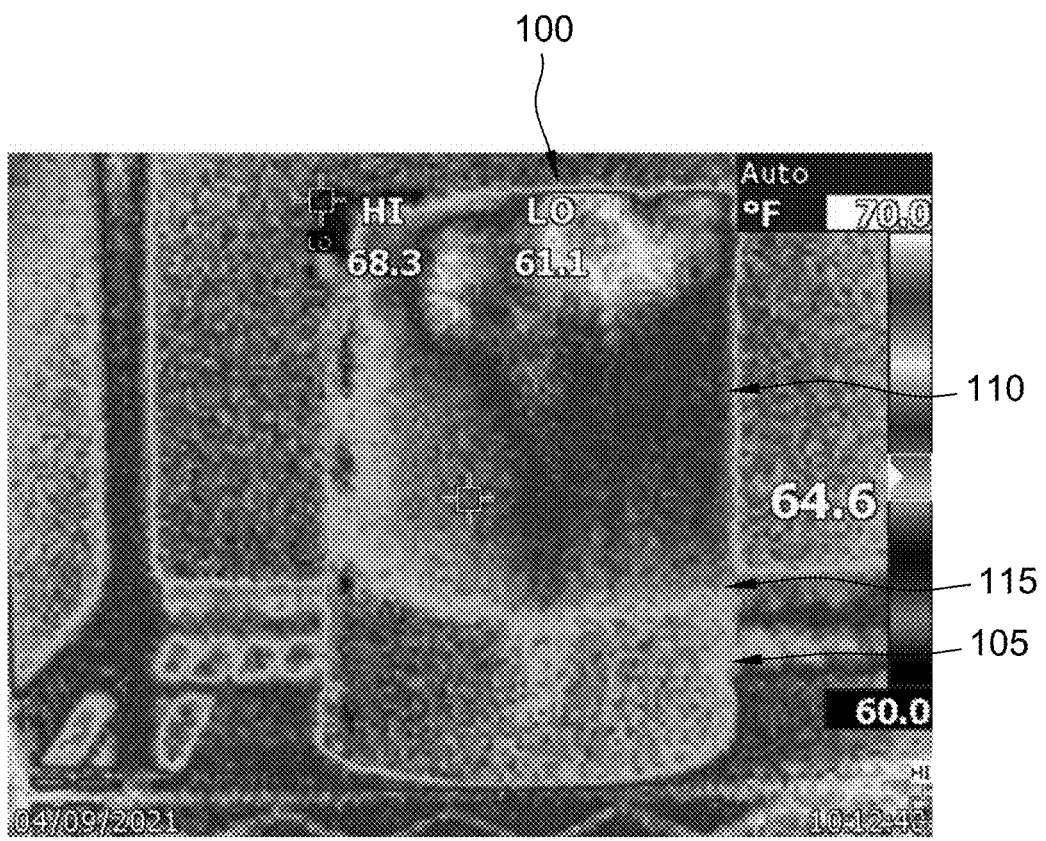
FIG. 1 illustrates a thermographic image of a tank with liquid, in accordance with one embodiment.

FIG. 1 illustrates a thermographic image of a tank 100, in accordance with one embodiment. The tank shown in FIG. 1 stores a liquid 105 and a gas 110, where the liquid 105 is at a different temperature than the gas 110. Based on the temperature difference, a level 115 of the liquid 105 in the tank 100 is visible in the thermographic image. The systems and methods described herein use that temperature difference to determine the level 115 of the liquid 105.

For liquids 105 that do not have a significant difference in temperature from the gas 110 in the tank, a heating unit can apply heat to the tank 100. The liquid 105 will absorb the heat differently than the gas 110 and a more significant temperature difference is then measurable.

In this example, the tank 100 is a sealed pressure vessel that stores a liquid 105, such as a refrigerant for a refrigeration unit. The tank 100 suitably includes steel or other ferrous metal, though other materials may be included.

While the primary example described herein is a tank or receiver filled with refrigerant, the systems and methods described herein would also be applicable for systems for storing other fluids, such as, but not limited to, water, oil, slurries, and/or other liquids. In some situations, the systems and methods could also be used on tanks that store some solids or semi-solids.

Figure 2:
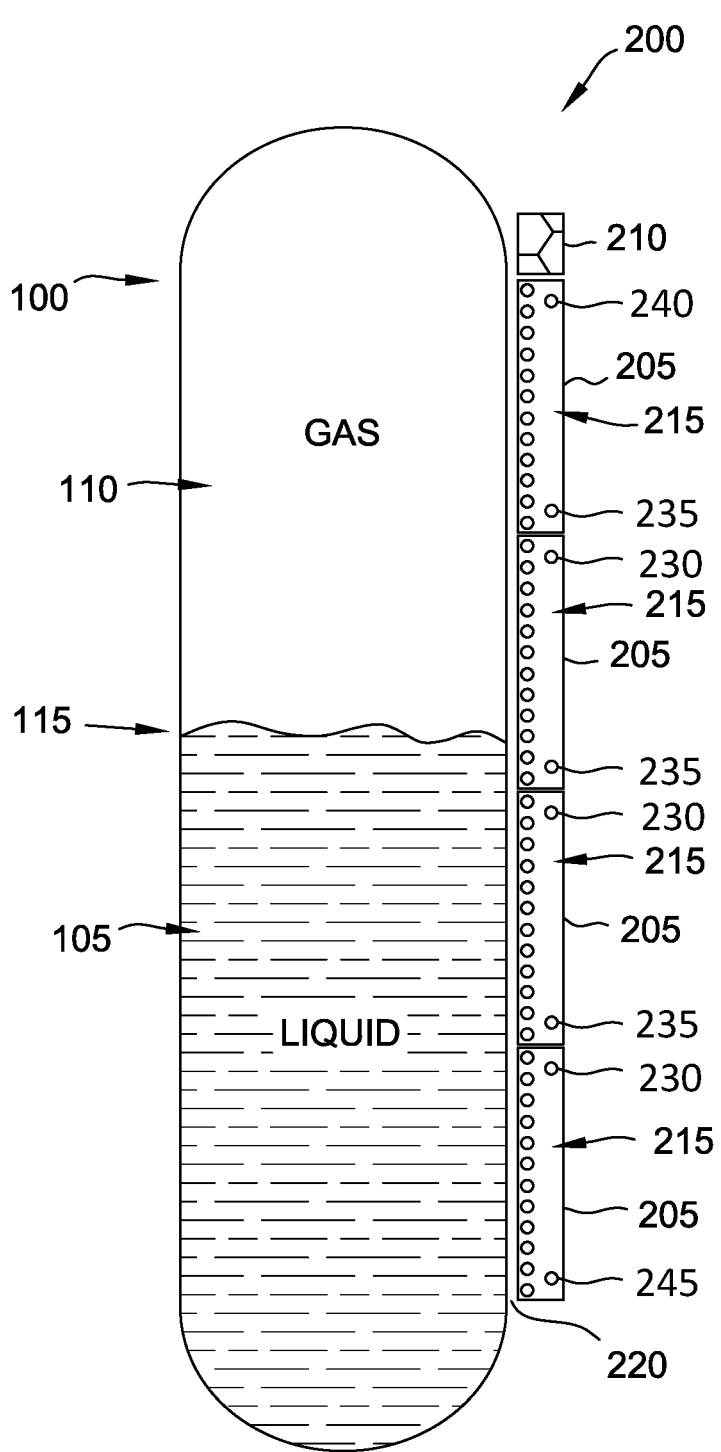
FIG. 2 illustrates an external tank level monitoring system attached to the tank shown in FIG. 1, in accordance with one embodiment.

FIG. 2 illustrates an external tank level monitoring system 200 attached to the tank 100 (shown in FIG. 1), in accordance with one embodiment.

The external tank level monitoring system 200 includes sensor arrays 205 and a tank monitoring computer device 210. The sensor arrays 205 each include sensors 215 that are thermally in contact with the tank 100. The tank monitoring computer device 210 is in communication with the sensor arrays 205 to receive readings from the sensors 215, which can be used to determine the level 115 of liquid 105 in the tank 100.

The sensor arrays 205 each include 12 evenly spaced sensors 215, where the sensors 215 are thermistors. The thermistors can include as negative temperature coefficient (NTC) thermistors or positive temperature coefficient (PTC) thermistors. The thermistors are thermally in contact with the tank 100. Fasteners are used to keep the individual sensors 215 in contact with the tank 100. The fasteners used to attach the sensor arrays 205 to the exterior of the tank 100 can include, but are not limited to, magnets, double faced tape, adhesive, or straps. The sensor arrays are serially in communication with the tank monitoring computer device 210. The sensors 215 can be individually wired and addressed, or the sensors 215 can be in a series thermistor arrangement, where the sensors 215 are effectively on the same circuit. In this configuration, the individual addresses of the sensors 215 in the series could be unavailable. Furthermore, the serial sensors 215 can provide simpler wiring and fewer connections.

In some further configurations, the sensor arrays 205 could be connected with wired connections between the sensor arrays 205. In one configuration, the sensor arrays 205 could include analog sockets for receiving jacks, such as headphone jacks.

The external tank level monitoring system 200 also includes a heater 220, such as a heater strip, which is also in communication with the tank monitoring computer device 210. The heater 220 can be used in situations where the temperature difference between the liquid 105 and the gas 110 is small. In these situations, the tank monitoring computer device 210 can activate the heater for a small period of time to add some heat to the system 200. The tank monitoring computer device 210 delays a period of time before receiving temperature readings from the sensors 215. Since the liquid 105 absorbs the heat at a much higher rate than the gas 110, the temperature difference between the two will be larger and easier to measure as there will be a stronger contrast. The heater strip 220 is positioned right next to the sensors 215. The heater 220 can be activated for varying amounts of time based on the configuration of the tank 100 and liquid. For example, in one configuration the heater 220 could be activated for two minutes. While in another configuration, the heater 220 could be continuously activated. The temperature that the heater 220 is set to depends on the tank configuration. For example, on a 200-300-gallon tank 100 of refrigerant, the heater 220 could be set to 85 degrees. In this example, the heater 220 might only change the temperatures at the sensors 215 by five to ten degrees. However, this can be enough to provide a detectable contrast for the sensors 215 based on how the fluid 105 and the gas 110 each react to and absorb the heat.

In one example, the heater 220 is activated for two minutes and the tank monitoring computer device 210 delays until the heater 220 has been activated for three quarters of the time or one minute and thirty seconds. In other examples, the tank monitoring computer device 210 reads the sensors 30 seconds to a minute after the heater 220 has been deactivated. After activating the heater 220, the tank monitoring computer device 210 collects readings until two mathematical methods of detecting the level 115 match as described further below.

The tank 100 can vary in size from one foot tall to several feet tall. In one example, the sensor arrays 205 include 12 sensors 215 spaced to cover a one-foot tall area. The sensor arrays 205 include clasps and/or linkages to attach one sensor array 205 to the next so that multiple sensor arrays 205 can be attached to a tank 100 and cover the multiple foot height of the tank 100.

In some further embodiment, the sensor arrays 205 can also include a top sensor 230 and a bottom sensor 235 in addition to the sensors 215. The top sensor 230 and the bottom sensor 235 can be on separate circuits from the other sensors 215 in the sensor array 205. The first top sensor 240 and the last bottom 245 can be used in some configurations. For example, the tank monitoring computer device 210 can receive the values from the first top sensor 240, the last bottom sensor 245, and the series chain of sensor arrays 205. In some embodiments, the first top sensor 240 and last bottom sensor 245 are used to differential the high and low temperatures in the tank 100. The top sensor 230 is configured as the first top sensor 240 when the top sensor 230 is on the first sensor array 205 connected to the tank monitoring computer device 210. The bottom sensor 235 is configured as the last bottom sensor 245 when the bottom sensor 235 is on the last sensor array 205 connected to the tank monitoring computer device 210. This can be configured during process 800 or process 900 (shown in FIGS. 8 and 9 respectively).

In situations where the sensors 215 in the sensor array 205 do not have known positions, the first top sensor 240 reading and the last bottom sensor 245 reading can be used for grouping purposes, where the reading from the first top sensor 240 can be used to group sensor readings for the gas portion 110 of the tank 100 and the last bottom sensor 245 can be used to group sensor readings for the liquid portion 105 of the tank 100. In some further embodiments, the difference between the reading for the first top sensor 240 and the reading for the last bottom sensor 245 can be compared to determine if heat should be added to the tank 100, such as through a heater 220. In some situations, the first top sensor 240 and the last bottom sensor 245 could be eliminated in situations where their temperature readings could be approximated or implied. In some of these embodiments, calculations can be made with and without the first top sensor 240 and the last bottom sensor 245. Then these calculations with and without can be compared to see if they match, as is further described below herein.

Figure 3:
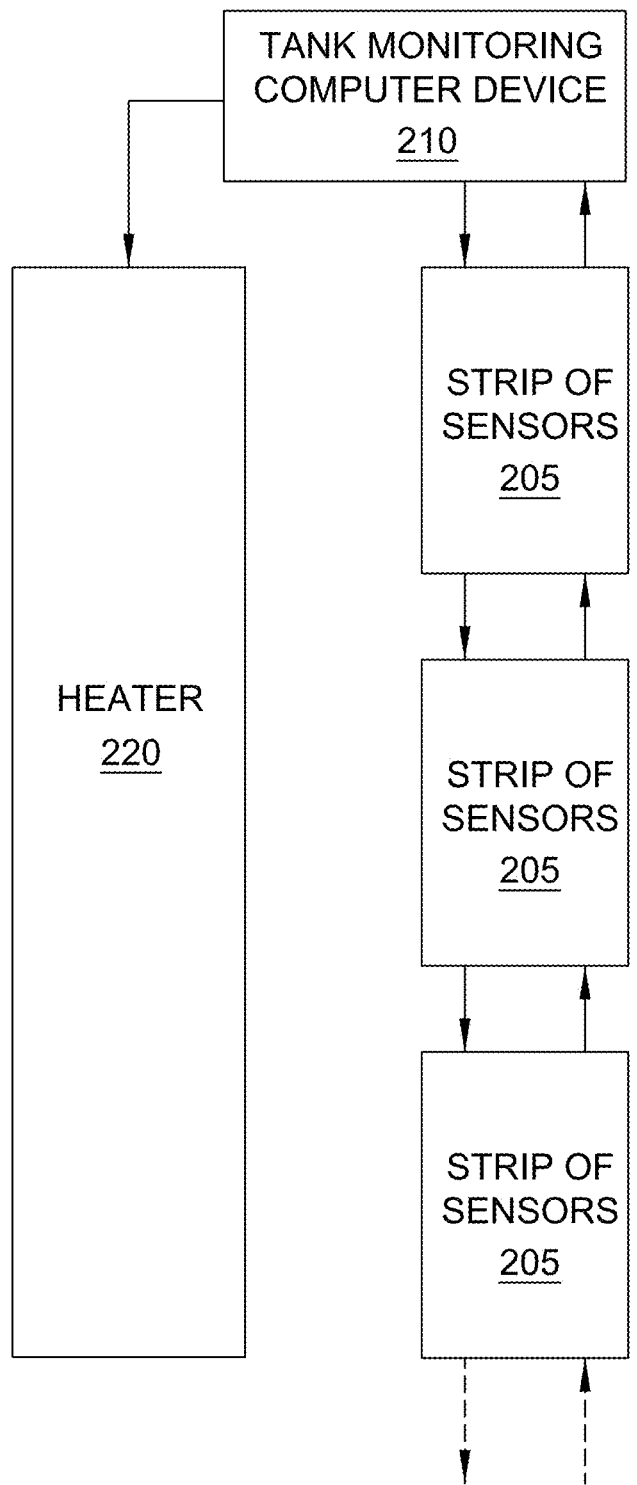
FIG. 3 illustrates another view of the external tank level monitoring system shown in FIG. 2.

FIG. 3 illustrates another view of the external tank level monitoring system 200 (shown in FIG. 2). FIG. 3 illustrates the communication connections between the tank monitoring computer device 210, the sensor arrays 205, and the heater 220. As shown in FIG. 3 communications flow from the tank monitoring computer device 210 to the first sensor array 205, then the second sensor array 205 to the third sensor array 205 and continuing on to the last sensor array 205 in the chain. Messages are then transmitted back up the chain of sensor arrays 205 to the tank monitoring computer device 210. The tank monitoring computer device 210 is also in communication with the heater 220 to tell the heater 220 when to add heat to the system 200.

Figure 4:
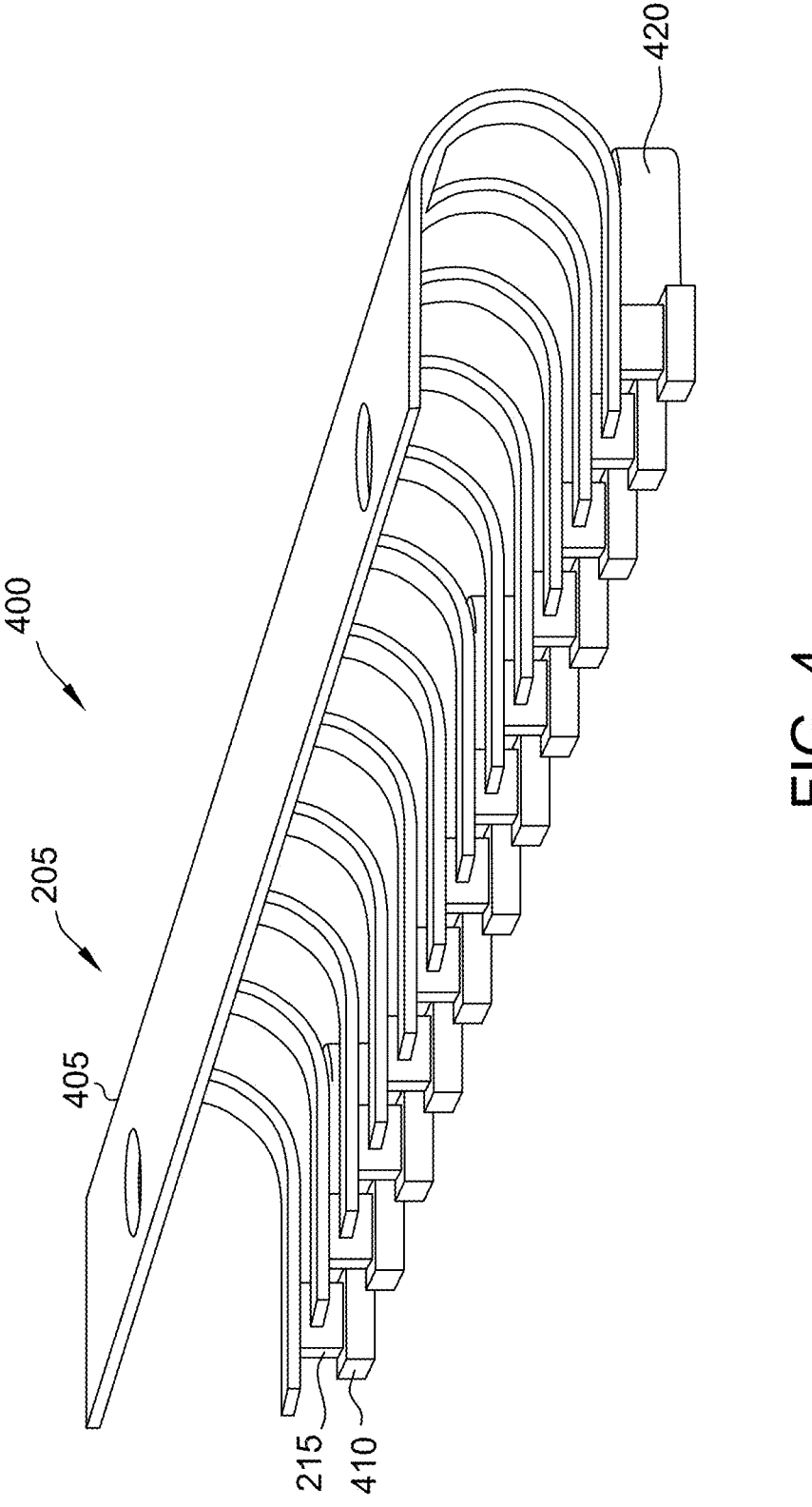
FIG. 4 illustrates a view of a first configuration of a sensor array for the external tank monitoring system shown in FIGS. 2 and 3.

FIG. 4 illustrates a view of a first configuration of a sensor array 400 for the external tank monitoring system 200 (shown in FIGS. 2 and 3). The sensor array 400 is similar to the sensor array 205 (shown in FIGS. 2 and 3).

The sensor array 400 includes a flexible circuit board 405, sensors 215, sensor magnets 410, and placement magnets 420. While magnets are described herein for fastening the sensor array 400 and sensors 215 to the external side of the tank 100, one having skill in the art would understand that other fasteners may be used, including, but not limited to, double faced tape, adhesive, and straps. The sensors 215 are suitably thermistors, but might also be digital thermometers, infrared thermocouples, digital temperature sensors, and other types of cryometers. The flexible circuit board 405 communicates with the sensors 215 and with connected sensor arrays 400, such as shown in FIG. 3.

Each sensor 215 is connected to a sensor magnet 410 that thermally connects the sensor 215 to the tank 100 (shown in FIG. 1). The sensor magnet 410 and/or the sensor 215 are encased in plastic to electrically isolate them from each other, while still allowing the sensor 215 to work as described. The placement magnets 420 magnetically attach the sensor array 400 to the tank 100.

Figure 5:
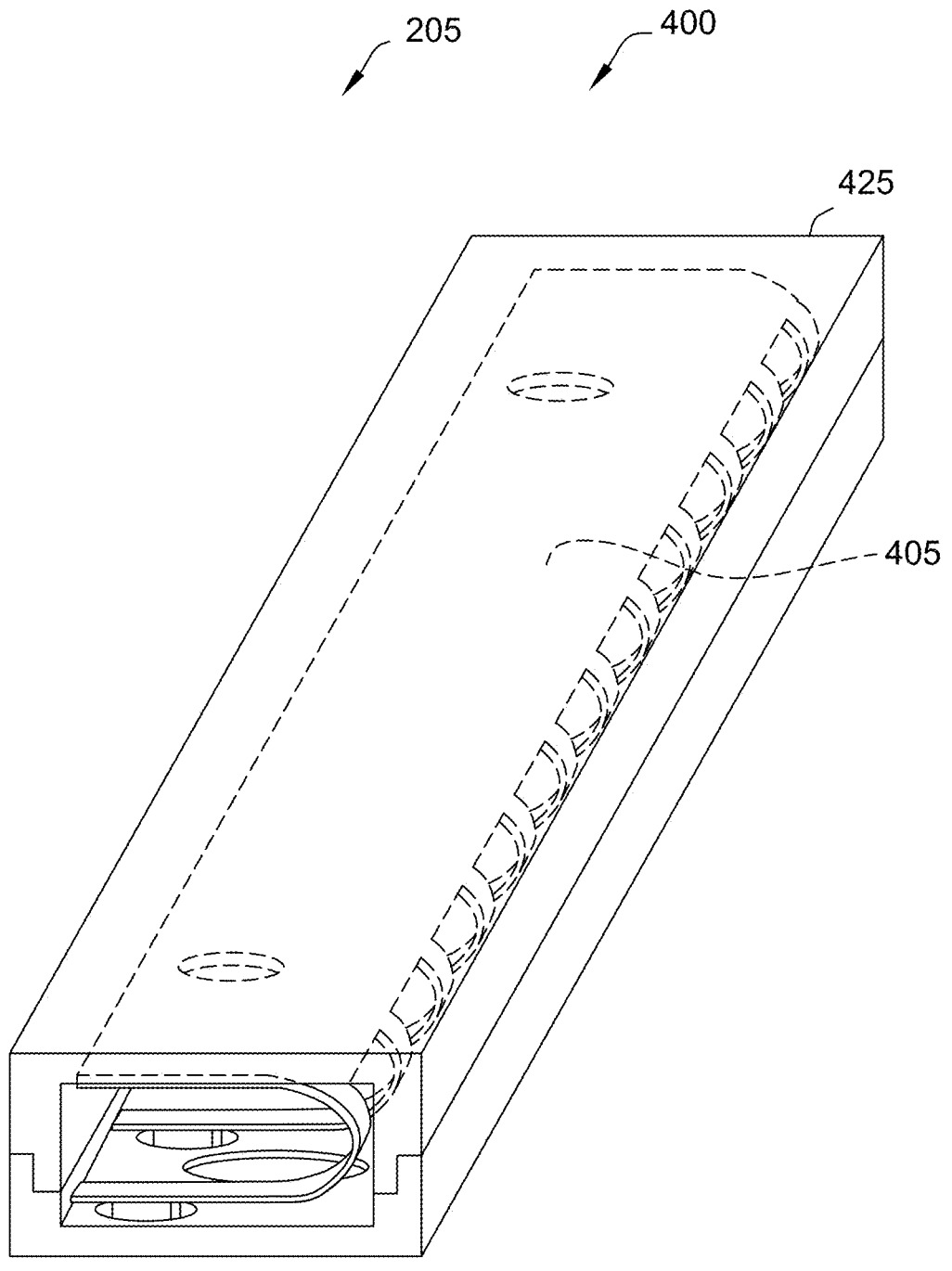
FIG. 5 illustrates another view of the first configuration of the sensor array for the external tank monitoring system shown in FIGS. 2 and 3.

FIG. 5 illustrates another view of the first configuration of the sensor array 400 for the external tank monitoring system 200 (shown in FIGS. 2 and 3). In FIG. 5, the sensor array 400 is enclosed in a housing 425. The housing 425 protects the flexible circuit board 405 and the sensors 215 (shown in FIG. 2). The housing 425 can also include openings to for the sensor magnets 410 (shown in FIG. 4) to keep the sensors 215 separated from each other by consistent amounts of space.

Figures 6, 7:
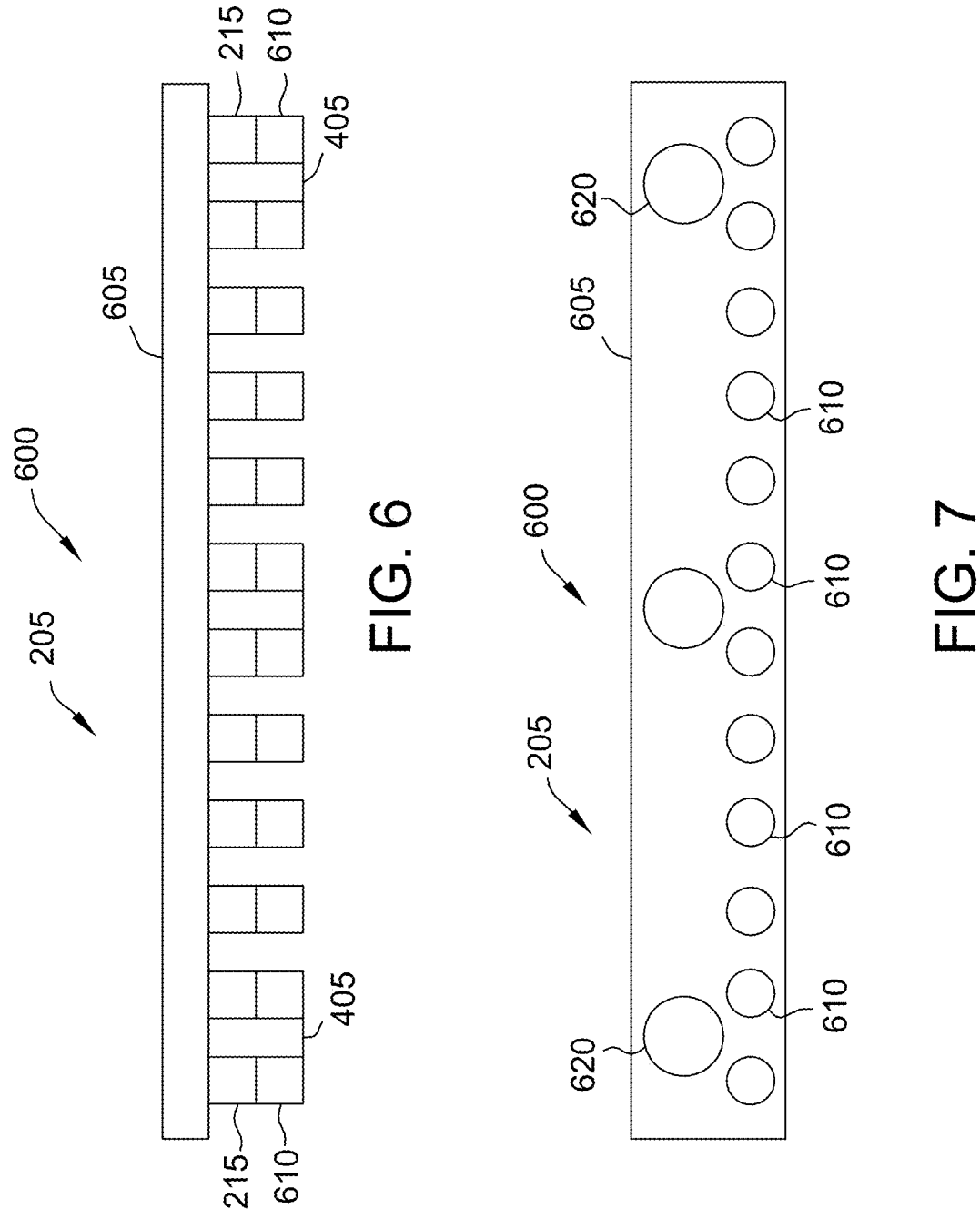
FIG. 6 illustrates a view of a second configuration of a sensor array for the external tank monitoring system shown in FIGS. 2 and 3.
FIG. 7 illustrates another view of a second configuration of a sensor array for the external tank monitoring system shown in FIGS. 2 and 3.

FIG. 6 illustrates a view of a second configuration of a sensor array 600 for the external tank monitoring system 200 (shown in FIGS. 2 and 3). The sensor array 600 is similar to the sensor array 205 (shown in FIG. 2) and sensor array 400 (shown in FIG. 4).

The sensor array 600 differs from sensor array 400 in that the circuit board 605 is in a flat solid configuration rather than a flexible circuit board 405 (shown in FIG. 4). The sensor array 600 further includes sensors 215, sensor magnets 610, and placement magnets 620. The sensors 215 can be thermistors. The circuit board 605 communicates with the sensors 215 and with connected sensor arrays 600, such as shown in FIG. 3.

Each sensor 215 is connected to a sensor magnet 610 that thermally connects the sensor 215 to the tank 100 (shown in FIG. 1). The sensor magnet 610 and/or the sensor 215 are encased in plastic to electrically isolate them from each other, while still allowing the sensor 215 to work as described herein. The placement magnets 620 magnetically attach the sensor array 600 to the tank 100.

FIG. 7 illustrates another view of the second configuration of the sensor array 600 for the external tank monitoring system 200 (shown in FIG. 2). In FIG. 7, the view of the sensor array 300 is a bottom view illustrating the proposed placement of the various magnets 610 and 620 as they would be in contact with the tank 100 (shown in FIG. 1).

Figure 8:
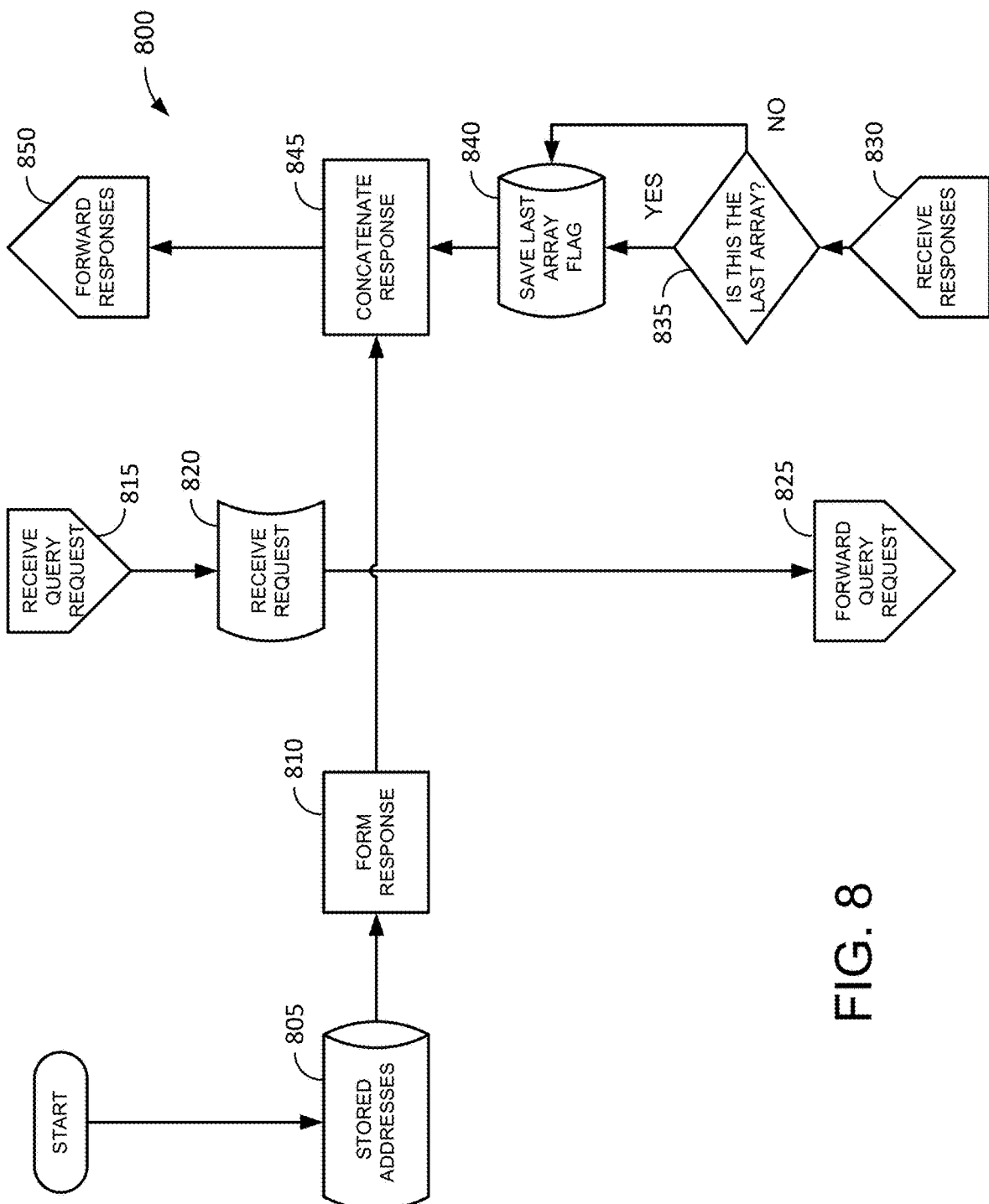
FIG. 8 illustrates a flowchart of a process for initializing a sensor array for the external tank monitoring system shown in FIG. 2.

FIG. 8 illustrates a flowchart of a process 800 for initializing a sensor array 205 (shown in FIG. 2) for the external tank monitoring system 200 (shown in FIG. 2). Process 800 is implemented by a sensor array 205. The sensor array 205 is in communication with other sensor arrays 205 and a tank monitoring computer device 210. Process 800 occurs when the sensor array 205 initializes, generally for the first time, although process 800 can also occur every time that the sensor array 205 initializes, such as upon powering up.

The sensor array 205 includes a memory device that stores a plurality of addresses where each address is associated with a sensor 215 (shown in FIG. 2) of the sensor array 205. The plurality of addresses can be within a block of 16 addresses for ease of use. The addresses can be set at the factory, when the sensor array 205 is manufactured. The sensor array 205 can randomly set the addresses based on a predetermined randomization method. When the sensor array 205 initializes, the sensor array 205 reads 805 the stored addresses and uses those stored addresses to form 810 a response with a listing of the available addresses of the sensors 215 in that sensor array 205.

During the initialization process 800 for the sensor array 205, the sensor array 205 receives 815 an address query request. The sensor array receives 815 the address query request from the tank monitoring computer device 210, either directly or through other sensor arrays 205 that are connected between the tank monitoring computer device 210 and the sensor array 205 in question. The sensor array 205 notes that the request was received 820 and forwards 825 the address query request to the next attached sensor array 205. If there is an attached sensor array 205, the sensor array 205 will receive 830 a response from the attached sensor array 205. The sensor array 205 checks to see if it is the last array 835 in the system 200. The sensor array 205 then stores 840 a last array flag in its memory indicating whether or not this sensor array 205 is the last array in the system 200. The sensor array 205 can determine that it is the last sensor array 205 in the system 200 if it doesn't receive a response from a next sensor array 205 after a predetermined period of time, aka five to thirty seconds. The sensor array 205 can then set the last array flag on its first initialization and not have to check again.

The sensor array 205 concatenates 845 the responses by combining the response formed in Step 810 with any received response 830 from attached sensor arrays 205. The sensor array 205 forwards 850 the concatenated response to the next sensor array 205 so that the tank monitoring computer device 210 receives a response with all of the addresses provided by all of the sensor arrays 205 in the system 200.

The sensor arrays 205 perform process 800 upon initialization or powering up. The tank monitoring computer device 210 can also instruct the sensor arrays 205 to perform process 800. As described above, the sensor arrays 205 are connected in a serial configuration, so that the query request for the addresses is passed from the tank monitoring computer device 210 through all of the sensor arrays 205 to the last sensor array 205 in the serial configuration. The last sensor array 205 forms the response along with its addresses and begins the process of passing the address response back through the sensor arrays 205 to the tank monitoring computer device 210. At each sensor array 205, the sensor array 205 adds its addresses to the response, and the tank monitoring computer device 210 receives a single response with all of the addresses from all of the sensor arrays 205 in the configuration.

Figure 9:
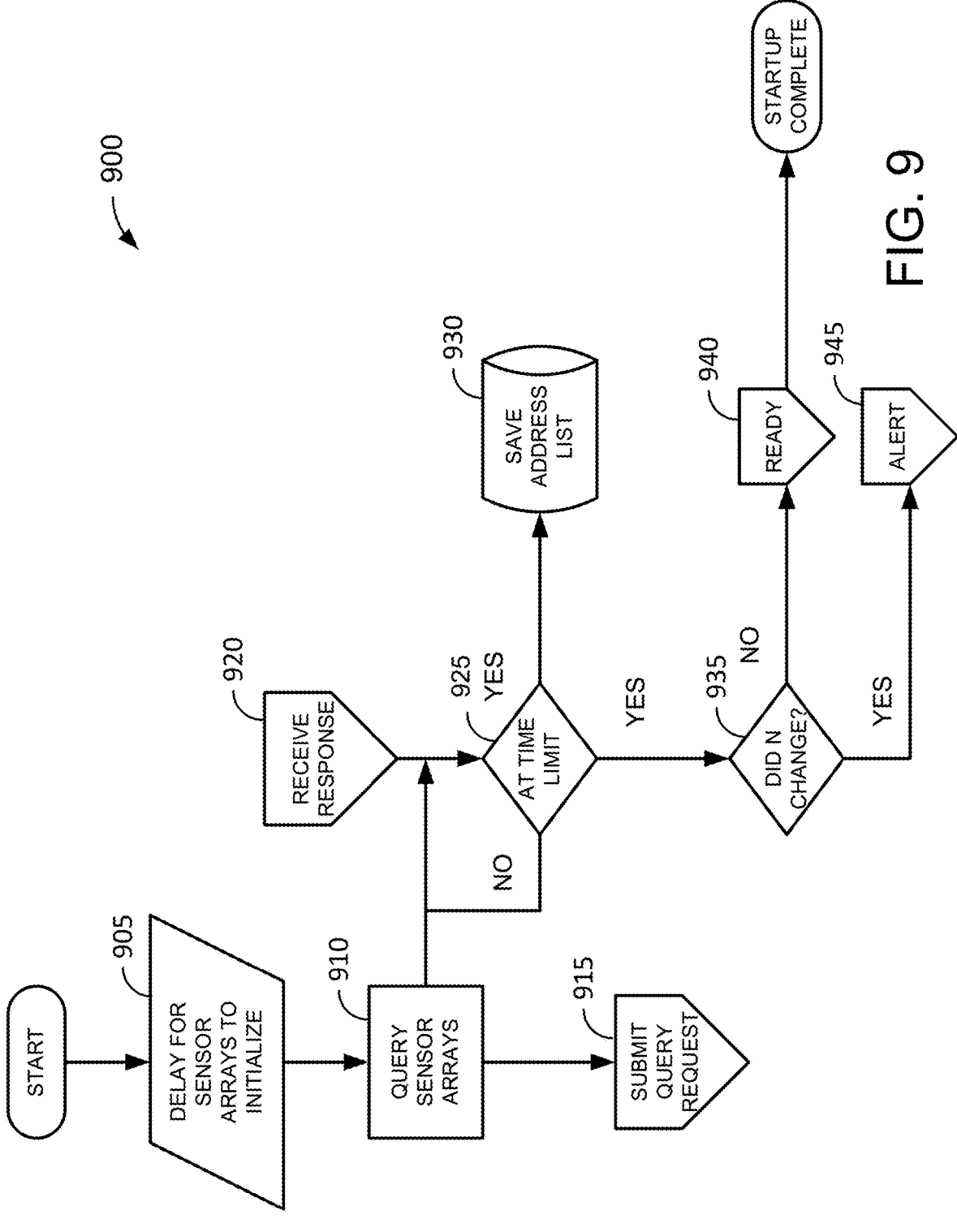
FIG. 9 illustrates a flowchart of a process for initializing the external tank monitoring system shown in FIG. 2.

FIG. 9 illustrates a flowchart 900 of a process for initializing the external tank monitoring system 200 (shown in FIG. 2). Process 900 is performed by the tank monitoring computer device 210 (shown in FIG. 2), which is attached to sensor arrays 205 (shown in FIG. 2) in a serial configuration. Process 900 occurs when the tank monitoring computer device 210 initializes, generally for the first time, although process 900 can also occur every time that the tank monitoring computer device 210 initializes, such as upon powering up and/or rebooting.

The tank monitoring computer device 210 delays 905 to give the attached sensor arrays 205 a chance to initialize. The delay could be a few seconds or more based on the expected response times of the attached sensor arrays 205. After the delay, the tank monitoring computer device 210 queries 910 the attached sensors arrays 205 for their addresses by submitting 915 the address query request. The sensor arrays 205 generate a response to the address query request as described above in process 800. The serially attached sensor arrays 205 submit a single response with all of the addresses from those sensor arrays 205. The tank monitoring computer device 210 receives 920 the response from the sensor arrays 920.

The tank monitoring computer device 210 waits a predetermined period of time until a time limit before reading the response. The predetermine period of time or time limit can be stored as one or more preferences. The predetermine period of time or time limit can be determined based on the average temperature of the liquid 110 and/or gas 115 in the tank 100, the thickness of the walls of the tank 100, the material of the walls of the tank 100, the size of the tanks 100, or other features of the tank 100 and its surroundings. The tank monitoring computer device 210 checks 925 to determine if the predetermined period of time passed and/or the time limit has been reached. If the time limit has not been reached, then the tank monitoring computer device 210 continues to wait. If the time limit has been reached, the tank monitoring computer device 210 saves 930 the address list from the response in a memory. The delay could be a few seconds or more based on the expected response times of the attached sensor arrays 205. The tank monitoring computer device 210 checks 935 to see if the number of sensors 215 (shown in FIG. 2) with addresses has changed. If the number of sensors 215 has not changed, then tank monitoring computer device 210 reports 940 that the system 200 is ready and initialized. If the number of sensors 215 in the system 200 has changed, then the tank monitoring computer device 210 transmits 945 an alert. For example, the system 200 has previously initialized, such as for the first time, and the addresses for the sensors 215 of the attached sensor arrays 205 are stored in the memory. If the number of sensors 215 in the memory is different than the number of sensors 215 detected during initialization process 900, that could be indicative of an error or failure of one or more of the sensor arrays 215, which requires an alert 945 to one or more users.

The first time that the process 900 is performed, the number of sensors 215 should change from 0 to a new number based on the number of attached sensor arrays 205. However, the tank monitoring computer device 210 can also know the number of sensors 215 in each sensor array 205 and determine if the number of sensors 215 and sensor addresses is incorrect. For example, if there are 12 sensors 215 on each sensor array 205, and the response returns 45 addresses instead of 48, the tank monitoring computer device 210 can report the discrepancy as a potential issue with the sensors 215.

Figure 10:
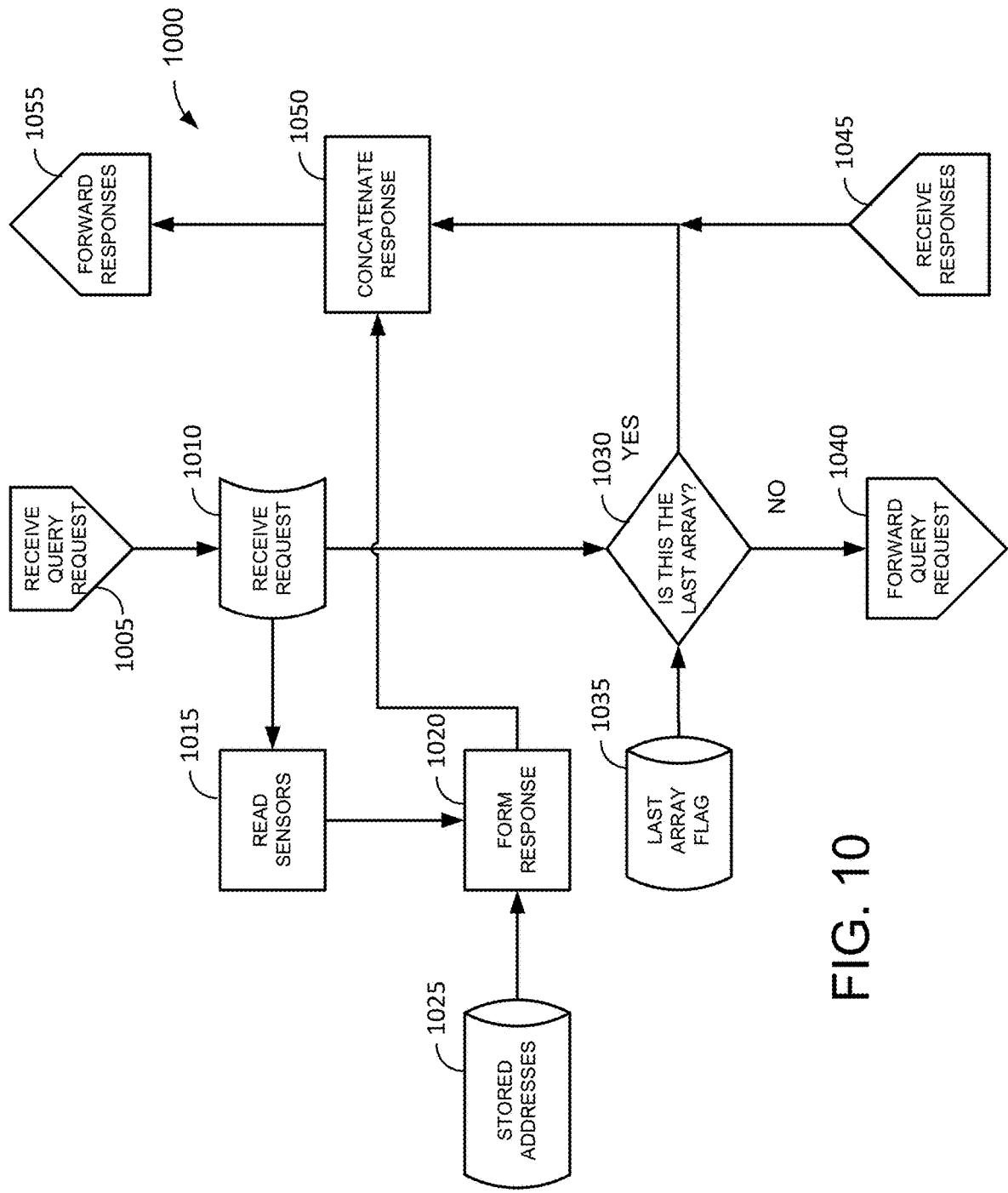
FIG. 10 illustrates a flowchart of a process for reading a sensor array for the external tank monitoring system shown in FIG. 2.

FIG. 10 illustrates a flowchart of a process 1000 for reading a sensor array 205 (shown in FIG. 2) for the external tank monitoring system 200 (shown in FIG. 2). Process 1000 is implemented by each sensor array 205. The sensor array 205 is in communication with other sensor arrays 205 and a tank monitoring computer device 210 (shown in FIG. 2).

The sensor array 205 receives 1005 a sensor query request. The sensor query request originates from the tank monitoring computer device 210 and passes through the serially connected sensor arrays. The sensor array receives 1010 the request. In response to the request, the sensor array 205 reads 1015 the sensors 215 (shown in FIG. 2) to receive values from those sensors 215. The sensor array 205 uses the stored addresses 1025 to form 1020 a response to the sensor query request.

The sensor array 205 also checks 1030 to determine if this sensor array 205 is the last sensor array 205 in the serial configuration. The sensor array 205 reviews the last array flag 1035 to check 1030 if this sensor array 205 is the last sensor array 205 in the configuration. If it is not the last, then the sensor query request is forwarded 1040 to the next sensor array 205 serially. Subsequently, in Step 1045 the sensor array 205 will receive a sensor response from the sensor array 205. If the sensor array 205 is the last, then the sensor array 205 will generate 1050 the response from its formed response 1020 and then forward 1055 its response to the next sensor array 205 or the tank monitoring computer device 210.

If the sensor array 205 received a response from a subsequent sensor array 205 in Step 1045, the sensor array 205 concatenates 1050 the received response with the formed response 1020 and forwards the combined response to the next sensor array 205 or the tank monitoring computer device 210. In some situations, each sensor array 205 transmits its own response, which are then passed to the tank monitoring computer device 210 by the other sensor arrays 205.

As described above, the sensor arrays 205 are connected in a serial configuration, so that the query request for the sensor information is passed from the tank monitoring computer device 210 through all of the sensor arrays 205 to the last sensor array 205 in the serial configuration. The last sensor array 205 forms the response along with its sensor readings for its addresses and begins the process of passing the sensor response back through the sensor arrays 205 to the tank monitoring computer device 210. At each sensor array 205, the sensor array 205 adds its sensor readings and corresponding addresses to the response, and the tank monitoring computer device 210 receives a single response with all of the sensor readings and addresses from all of the sensor arrays 205 in the configuration.

Figure 11:
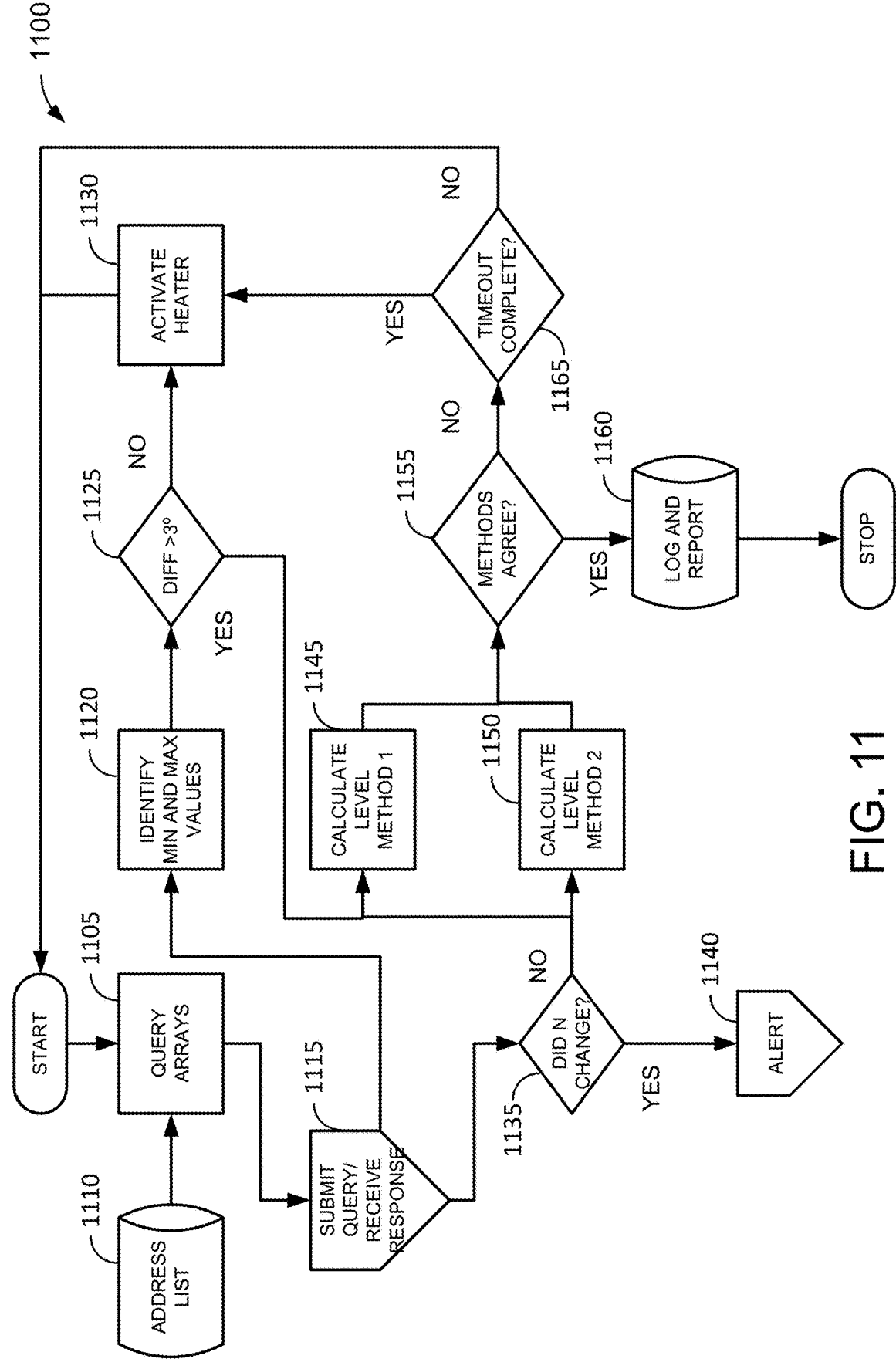
FIG. 11 illustrates a flowchart of a process for controlling the external tank monitoring system shown in FIG. 2.

FIG. 11 illustrates a flowchart of a process 1100 for controlling the external tank monitoring system 200 (shown in FIG. 2). Process 1100 can be performed by the tank monitoring computer device 210 (shown in FIG. 2), which is attached to sensor arrays 205 (shown in FIG. 2) in a serial configuration. Process 1100 can occur based on a time, an external request, and/or continuously.

Upon receiving a trigger, which could be a timer, an external request, and/or continuously, the tank monitoring computer device 210 queries 1105 the attached sensor arrays 205 based on the stored address list 1110. The tank monitoring computer device 210 submits 1115 the sensor query and receives a response as described above. The tank monitoring computer device 210 uses the response to identify 1120 minimum and maximum values for the sensor readings. The tank monitoring computer device 210 identifies 1120 representative values for the minimum and maximum values. The representative values are used to reduce noise in the system. The tank monitoring computer device 210 determines 1125 if there is a difference of greater than three degrees between the minimum and maximum values. If there is a less than three degrees difference, the tank monitoring computer device 210 can activate 1130 the heater 220 (shown in FIG. 3) to add heat to the system 200 to potentially provide a greater contrast in temperatures.

The tank monitoring computer device 210 also checks 1135 to determine if the number of sensors 215 has changed. If there is a change in the number of sensors 215, the tank monitoring computer device 210 issues an alert. The change in number of sensors 215 may be indicative of an issue with the sensors 215 that may need to be addressed.

If the number of sensors 215 did not change and the difference in temperature is greater than three degrees, the tank monitoring computer device 210 uses at least two different methods to calculate 1145 and 1150 the level 115 of fluid 105 in the tank 100 (all shown in FIG. 1). There are multiple different calculation methods that can be used for determining the level 115 of the tank 100. Some of the methods differ depending on whether the locations of the sensors 215 are known. Several different equations and methods are described further below. The tank monitoring computer device 210 compares 1155 the results of the two methods and determines if the results of those methods agree, such as being within a predetermined amount (value) from each other. If the results agree, then the tank monitoring computer device 210 logs 1160 the level 115 and reports the level 115, thus ending process 1100. If the results do not agree, then the tank monitoring computer device 210 determines 1165 if any timeout associated with the heater 220 has completed. The currently described process 1100 describes using two different methods for calculating the level 115 and then comparing them to get a match. This method provides for greater accuracy in determining the level 115 of the liquid 105 in the tank 100. In other embodiments, the tank monitoring computer device 210 can also perform multiple different calculations using multiple different methods and then pick the two or more that match to get the level 115. In other embodiments, the tank monitoring computer device 210 can just perform one calculation to determine the level of liquid 105 in the tank 100. If the timeout has completed, the tank monitoring computer device 210 activates 1130 the heater 220 and restarts process 1100. If the timeout has not completed, then the tank monitoring computer device 210 restarts process 1100.

In some situations, the location of each sensor 215 is known in relation to the other sensors 215. The addresses of the different locations of the each sensor 215 could have been discovered during initialization in processes 800 and 900 (shown in FIGS. 8 and 9, respectively) Using the addresses, the location of each sensor 215 on its sensor array 205 can be determined. Furthermore, each sensor array 205 can also include its own address prefix, so that the tank monitoring computer device 210 knows the order and relative locations of the sensor arrays 205. In these situations, the tank monitoring computer device 210 receives the values from the sensors 215 and analyzes them for a step jump in values representing the difference in temperature between the gas 110 and the liquid 105 at the level 115.

In some other situations, the specific location of each sensor 215 is not known. In these situations, methods for calculating the level, such as those used in steps 1145 and 1150, can include discrete sensor classification methods. For example, these methods can include classification methods such as, but not limited to, Otsu, Jenks, Centroid-based clustering, k-means clustering, nearest centroid classifier, and Rocchio algorithm. While these classification methods could be computationally complex with significant overhead, with only two classifications (gas or liquid) and potentially 60-70 sensors, the methods can be more reasonably performed by the tank monitoring computer device 210. These methods can also include simple or non-iterative methods, such as splitting the population of sensors 215 at the midpoint between the minimum and maximum values and splitting based on a mean and skew. Furthermore, the methods for calculating can be designed to group the population of sensors 215 into two groups based on their readings to allow the tank monitoring computer device 210 to determine the level 115 of fluid 105 in the tank 100.

In some situations, individual values could be known, but not each values position or location. In these situations, a method for analyzing the series of sensors could be applied using Equation 1, which could be used as a method for calculating the level 115 as described in steps 1145 and 1150.

$$x = \frac{-(R_H * n) + R_t}{R_c - R_H} \qquad \text{EQ. 1}$$

where Rt is the total resistance of the series of sensor arrays 205, $R_H$ is the nominal resistance of a 'hot' section thermistor (i.e. top of the tank 100), $R_c$ is the nominal resistance of a 'cold' section thermistor (i.e. bottom of the tank 100), n is the total number of thermistors in the series of sensor arrays 205, and x is the height of the liquid 105, aka the level 115 of the liquid 105 in the tank 100. When Equation 1 is solved for x, the calculated height x is based on the relative number of 'hot' section thermistors to the relative number of 'cold' section thermistors.

Another method that could be used in either step 1145 or 1150 could be to use a step difference method that can include analyzing the sensor readings to recognize a localized slope. In this method, an input is an array of the temperature values from the sensors 215 sorted by increasing value. A simple rolling average is calculated to smooth any peaks in the slope. The array is reviewed to find the change between the sensors 215 in order where the difference is to n+1. This can be performed by making a shifted copy of the array and subtracting. As an alternative, the tank monitoring computer device 210 can step through the array and subtract the previous value. Then the ends are trimmed to avoid erroneous values due to wraparound. The maximum value is identified and then offset by three for the missing first value, the lag from the difference function, and the array index versus position.

A further method that could be used in either step 1145 or 1150 could be to use a statistical method that can include identifying the maximum and minimum values. Calculating the span distance between the maximum and minimum values. For all of the values, determine the difference between the value and the minimum value as a function of the total span. Calculate the mean, root mean square, and the standard deviation for the difference values. If the root mean square is greater than 0.5 then the standard deviation is negative, otherwise the standard deviation is positive. Calculate Y to be the standard deviation plus the mean. For X=1 to N, determine if the corresponding value is greater than Y. The level 115 is then calculated based on the number of values where the corresponding value is greater than Y.

A still further method that could be used in either step 1145 or 1150 could be where the tank monitoring computer device 210 reads all of the sensors 215. This can work in a serial sensor 215 configuration where the tank monitoring computer device 210 does not know the locations of the individual sensors. The tank monitoring computer device 210 calculates an average or median value. The tank monitoring computer device 210 counts the populations of sensors 215 cooler than the average or mean. This allows the tank monitoring computer device 210 to determine the level 115.

While several methods for calculating the level 115, such as for steps 1145 and 1150, are described herein, one having skill in the art may determine other methods for determining the level. Furthermore, the present disclosure includes performing multiple methods for determining the level 115 and then using those methods that match or have corresponding answers. The tank monitoring computer device 210 can continue to monitor sensor values and perform calculations until two or more of the calculation methods agree. The calculation methods can be within a certain value of each other to agree, such as, but not limited to, one sensor count difference.

The tank monitoring computer device 210 accounts for noise in the readings from the tank 100. The noise issue can be corrected by knowing the location of each sensor 215 in relation to each other, such as through zone differentiation and low sensor variance. To contend with 'noisy' conditions, detection routines can be used to detect the level 115. The various noise reduction methods are essentially detecting the localized scope. For example, these methods could include, but are not limited to, simple rolling average to smooth peaks, finding the change between the sensors 215 in order, trimming the ends that may have erroneous values due to wraparound, finding the max value, and/or offsetting by three for missing first value, lag from the difference function, and the array index versus positions.

Other information that may be collected by the tank monitoring computer device 210 includes, but is not limited to, how much the temperature is changing, the amount of the change, and how long since heat was added to the tank 100.

The tank monitoring computer device 210 stores the relative position of each sensor 215 in the attached sensor arrays 205. In other embodiments, the tank monitoring computer device 210 does not know the positions of each sensor 215.

The tank monitoring computer device 210 is in communication with remote computer devices (not shown). The tank monitoring computer device 210 reports tank levels 115 and potential errors with sensors 215 to the remote computer devices. The remote computer devices can be connected to the tank monitoring computer device 210 via wired or wireless connections. In some cases, the remote computer devices can request a current fluid level from the tank monitoring computer device 210, where the tank monitoring computer device 210 activates process 1100 in response to the request. The remote computer devices can be in communication with multiple tank monitoring computer devices 210 associated with multiple tanks 200.

The tank monitoring computer device 210 is constantly checking the level 115 of the liquid 105 in the tank 100. In these embodiments, the tank monitoring computer device 210 is checking for rapid changes in the tank level 115 which may be indicative that something in the associated refrigeration system is open or stuck in a specific position.

In some other embodiments, the tank monitoring computer device 210 checks the level 115 of the liquid 105 in the tank 100 at a specific time every day. The specific time is chosen when the refrigerant system may be stable and the loads are consistent. For example, for a refrigerant system in a grocery store, 3 AM may be chosen because there would be minimum of opening and closing the door of the refrigerated case that is being temperature controlled by the refrigerant tank 100, so the refrigerant system would be mostly stable. In these embodiments, the tank monitoring computer device 210 may be checking for a trend or other indication that there may be a problem, such as a leak in the refrigerant system or expansion control devices that are not working properly.

In an embodiment, sensor arrays are connected or attached to the tank so that the sensors are thermally connected to the tank. The sensor arrays include multiple sensors that are thermally connected to the tank. The sensors can include thermistors, such as negative temperature coefficient (NTC) thermistors or positive temperature coefficient (PTC) thermistors. The sensor arrays are magnetically connected to the tank. A magnet may be connected or attached to each sensor to attach each sensor individually to the tank, and magnets may be connected or attached to the housing of the sensor array to keep it in place in relation to the other sensor arrays. The sensor arrays are serially connected to each other physically and communicatively. In the embodiment, at one end of the sensor arrays is the tank monitoring computer device. The tank monitoring computer device communicates with the sensor arrays and receives readings from each of the sensors. The tank monitoring computer device is capable of determining the level of liquid in the tank based on the plurality of readings from the plurality of sensors.

The tank monitoring computer device performs multiple discrete sensor classifications on the plurality of sensor reading to determine the level of liquid in the tank. In this embodiment, if two of the classifications agree (are within a predetermined threshold from each other) with each other, then that tank level is reported. In some embodiments, the tank monitoring computer device constantly monitors the tank level. In other embodiments, the tank monitoring computer device determines the tank level upon request or based on a timer.

Figure 12:
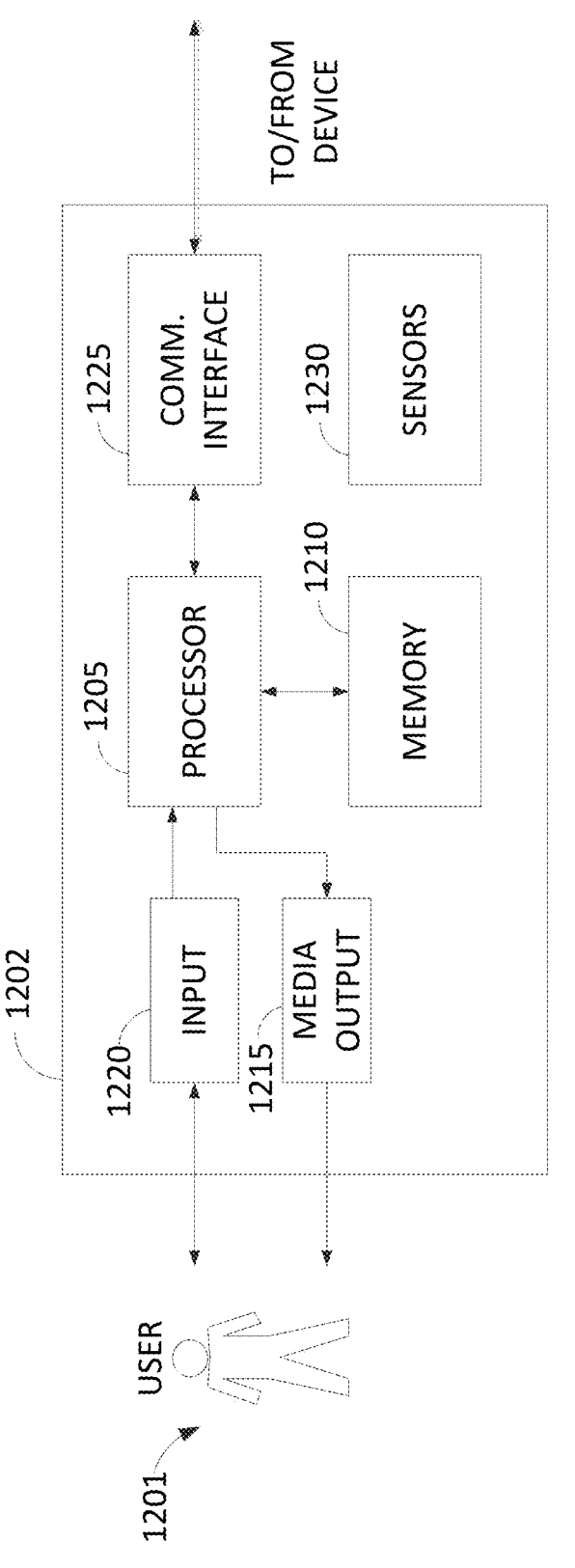
FIG. 12 depicts a configuration of a computer device shown in FIG. 2, in accordance with one embodiment.

In FIG. 12 depicts a configuration of a computer devices shown in FIG. 2, in accordance with one embodiment. User computer device 1202 may be operated by a user 1201. User computer device 1202 may include, but is not limited to, tank monitoring computer device 210 and sensor array 205 (both shown in FIG. 2). User computer device 1202 may include a processor 1205 for executing instructions. Executable instructions are suitably stored in a memory area 1210.

Processor 1205 may include one or more processing units (e.g., in a multi-core configuration). Memory area 1210 may be any device allowing information such as executable instructions and/or transaction data to be stored and retrieved. Memory area 1210 may include one or more computer readable media.

User computer device 1202 may also include at least one media output component 1215 for presenting information to user 1201. Media output component 1215 may be any component capable of conveying information to user 1201. Media output component 1215 may include an output adapter (not shown) such as a video adapter and/or an audio adapter. An output adapter may be operatively coupled to processor 1205 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

Media output component 1215 may be configured to present a graphical user interface (e.g., a web browser and/or a client application) to user 1201, such as through an attached computer device. A graphical user interface may include, for example, an online store interface for viewing temperatures and/or tank liquid levels. User computer device 1202 may include an input device 1220 for receiving input from user 1201. User 1201 may use input device 1220 to, without limitation, select and/or enter one or more items to view, such as a specific tank's liquid level.

Input device 1220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 1215 and input device 1220.

User computer device 1202 may also include a communication interface 1225, communicatively coupled to a remote device such as tank monitoring computer device 210. Communication interface 1225 may include, for example, a wired or wireless network adapter and/or a wireless data transceiver for use with a mobile telecommunications network.

Stored in memory area 1210 are, for example, computer readable instructions for providing a user interface to user 1201 via media output component 1215 and, optionally, receiving and processing input from input device 1220. A user interface may include, among other possibilities, a web browser and/or a client application. Web browsers enable users, such as user 1201, to display and interact with media and other information typically embedded on a web page or a website from tank monitoring computer device 210. A client application allows user 1201 to interact with, for example, tank monitoring computer device 210. For example, instructions may be stored by a cloud service, and the output of the execution of the instructions sent to the media output component 1215.

Processor 1205 executes computer-executable instructions for implementing aspects of the disclosure. The processor 1205 is transformed into a special purpose microprocessor by executing computer-executable instructions or by otherwise being programmed. For example, the processor 1205 may be programmed with the instruction such as illustrated in FIGS. 8-11.

User computer device 1202 may include, or be in communication with, one or more sensors, such as sensor 215 (shown in FIG. 2). User computer device 1202 may be configured to receive data from the one or more sensors and store the received data in memory area 1210. Furthermore, user computer device 1202 may be configured to transmit the sensor data to a remote computer device, such as tank monitoring computer device 210, through communication interface 1225.

The present embodiments may relate to, inter alfa, systems and methods for externally monitoring a liquid level in a tank. The process is performed by a tank monitoring computer device, also known as a monitor controller.

The technical problems addressed include, for example: (i) improving the accuracy of determining a level of liquid in a sealed tank; (ii) reducing the need to modify existing tanks to add a monitoring system; (iii) improving the accuracy of detecting potential problems with tanks; and (iv) reducing the complexity of installing tank monitoring systems. The technical advantages also include, for example: (i) adding fluid level monitoring to an existing tank without requiring modifications to the integrity of the tank; (ii) reducing the set-up requirements for monitoring systems; (iii) reducing the chance of user error in the set-up of monitoring systems; and (iv) providing a monitoring system that is configurable for different sized tanks.

The methods and systems described may be implemented using computer programming or engineering techniques including computer software, firmware, hardware, or any combination or subset thereof, wherein the technical effects may be achieved by performing at least one of the following steps: a) receive a plurality of sensor readings from the plurality of sensors associated with the at least one sensor array; b) calculate a first tank level using a first method; c) calculate a second tank level using a second method; d) compare the first tank level to the second tank level to determine a final tank level; e) report the final tank level; f) determine a maximum value and a minimum value from the plurality of sensor readings; g) compare the minimum value to the maximum value to detect a difference; h) if the difference is less than a predetermined threshold, activate a heater to apply heat to the tank and request updated sensor readings from the plurality of sensors associated with the at least one sensor array; i) serially connect the tank monitoring computer device to a first sensor array which is serially connected to a second sensor array; j) transmit a sensor request message to the first sensor array, wherein the first sensor array forwards the sensor request message to the second sensor array; k) receive a sensor response including the plurality of sensor readings from the plurality of sensors associated with the first sensor array and the second sensor array; l) store a plurality of addresses for the plurality of sensors, wherein each sensor of the plurality of sensors is associated with an address of the plurality of addresses; m) receive the plurality of addresses from the at least one sensor array upon initialization of the sensor array and the tank monitoring computer device.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In some embodiments, a processing element may be instructed to execute one or more of the processes and subprocesses described above by providing the processing element with computer-executable instructions to perform such steps/sub-steps, and store collected data (e.g., sensor addresses, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

The example systems and methods described and illustrated herein therefore significantly increase the safety of operation of autonomous and semi-autonomous vehicles by reducing the potential for damage to the vehicles and the vehicle's surroundings.

Examples of systems and methods for externally monitoring tanks are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A system for externally monitoring a tank level comprising:

a tank monitoring computer device; and a plurality of sensor arrays, wherein each sensor array of the plurality of sensor arrays includes a housing enclosing a plurality of sensors that are serially connected and also includes a plurality of fasteners, wherein the plurality of sensor arrays includes a first sensor array and a second sensor array, wherein the tank monitoring computer device is serially connected to the first sensor array, wherein the plurality of sensors includes a first sensor and a last sensor, wherein the plurality of sensors are serially connected from the first sensor to the last sensor, wherein the first sensor array is serially connected to the second sensor array, wherein each sensor array is configured to be externally attached to a tank by the plurality of fasteners, wherein the first sensor of the first sensor array is a first top sensor, and wherein the last sensor of the second sensor array is a last bottom sensor, wherein the second sensor array is a last sensor array of the plurality of sensor arrays; and wherein the tank monitoring computer device is in communication with the plurality of sensor arrays, and wherein the tank monitoring computer device is programmed to:

transmit a sensor query request to the first sensor array;

receive a sensor query response from the second sensor array including a plurality of sensor readings from the plurality of sensors associated with the plurality of sensor arrays, wherein the plurality of sensor readings are readings of a plurality of surface temperatures of the tank at a plurality of points along the exterior of the tank;

calculate a first tank level using a first method and the plurality of sensor readings, the plurality of sensor readings comprising:

a first top sensor reading including a sensor reading for a gas portion of the tank, and a last bottom sensor reading including a sensor reading for a liquid portion of the tank, wherein the plurality of sensor readings is grouped for the gas portion based on the first top sensor reading, wherein the plurality of sensor readings are grouped for the liquid portion based on the last bottom sensor reading, and wherein the plurality of sensor readings grouped for the gas portion and the plurality of sensor readings grouped for the liquid portion are used in the first method to calculate the first tank level; and report the first tank level, and wherein the first sensor array is configured to:

receive the sensor query request from the tank monitoring computer device;

collect a first plurality of sensor readings from the plurality of sensors in the first sensor array;

create the sensor query response with the first plurality of sensor readings; and transmit the sensor query response to an attached sensor array of the plurality of sensors arrays, and wherein the last sensor array is configured to:

receive the sensor query response from an attached sensor array of the plurality of sensor arrays, wherein the sensor query response includes a plurality of sensor readings including sensor readings from the attached sensor array;

collect a second plurality of sensor readings from the plurality of sensors in the second sensor array;

append the second plurality of sensor readings to the sensor query response; and transmit the sensor query response to the tank monitoring computer device.

2. The system of claim 1, wherein the tank monitoring computer device is further programmed to:

calculate a second tank level using a second method and the plurality of sensor readings;

compare the first tank level to the second tank level to determine a final tank level; and report the final tank level.

3. The system of claim 1, wherein the tank monitoring computer device is further programmed to:

determine a maximum value and a minimum value from the plurality of sensor readings;

compare the minimum value to the maximum value to detect a difference; and if the difference is less than a predetermined threshold, activate a heater to apply heat to the tank and request updated sensor readings from the plurality of sensors associated with the plurality of sensor arrays.

4. The system of claim 1, wherein the plurality of fasteners include a plurality of magnets, and wherein a magnet of the plurality of magnets is associated with each sensor of the plurality of sensors to thermally attach to the corresponding sensor to the tank.

5. The system of claim 1, wherein the plurality of fasteners include at least one of double faced tape, adhesive, or straps.

6. The system of claim 1, wherein the plurality of sensors are thermistors.

7. The system of claim 1, wherein each sensor array of the plurality of sensor arrays includes 12 sensors.

8. The system of claim 1, wherein the tank monitoring computer device is further programmed to:

store a plurality of addresses for the plurality of sensors, wherein each sensor of the plurality of sensors is associated with an address of the plurality of addresses; and receive the plurality of addresses from the plurality of sensor arrays upon initialization of the plurality of sensor arrays and the tank monitoring computer device.

9. The system of claim 1, wherein the plurality of sensors in the plurality of sensor arrays are in a serial configuration, and wherein the tank monitoring computer device is further programmed to receive the plurality of sensor readings from the plurality of sensors in the serial configuration.

10. The system of claim 1, wherein individual sensors for the plurality of sensors are unavailable, and wherein the tank monitoring computer device is further programmed to calculate a first tank level using a first method based upon the plurality of sensor readings.

11. The system of claim 1, wherein the second sensor array is configured to:

receive a plurality of sensor readings from the first sensor array;

determine a plurality of sensor readings for the second sensor array;

concatenate the plurality of sensor readings from the second sensor array and the plurality of sensor readings for the first sensor array; and provide the concatenated plurality of sensor readings to the tank monitoring computer device.

12. The system of claim 1, wherein the tank monitoring computer device is further programmed to:

calculate a plurality of tank levels using a plurality of methods and the plurality of sensor readings;

compare the plurality of tank levels to determine at least two tank levels that match the plurality of tank levels that match;

determine a final tank level based upon the at least two tank levels that match; and report the final tank level.

13. The system of claim 1, wherein the plurality of sensor arrays include a third sensor array, wherein the third sensor array is serially connected between the first sensor array and the second sensor array, wherein the first sensor of the third sensor array is connected to the last sensor of the first sensor array, and wherein the last sensor of the third sensor array is connected to the first sensor of the second sensor array.

14. A tank monitoring computer device comprising at least one processor in communication with at least one memory device, the tank monitoring computer device in communication with a plurality of sensor arrays each including a plurality of sensors externally attached to a side of a tank, wherein the at least one processor is programmed to:

initialize the plurality of sensor arrays by transmitting an address query request to the plurality of sensor arrays, wherein the plurality of sensor arrays includes a first sensor array and a second sensor array, wherein the tank monitoring computer device is serially connected to the first sensor array, wherein the plurality of sensors includes a first sensor and a last sensor, wherein the plurality of sensors are serially connected from the first sensor to the last sensor, wherein the first sensor array is serially connected to the second sensor array, and wherein the second sensor array is a last sensor array of the plurality of sensor arrays;

receive an address query response from the last sensor array including address information for the plurality of sensors in the plurality of sensor arrays, wherein, prior to the at least one processor receiving the address query response from the last sensor array, the address query response is received by the last sensor array from an attached sensor array, wherein the address query response includes the address information for the plurality of sensors in the plurality of previous sensor arrays, and wherein the last sensor array is configured to determine that it is the last sensor array, add its address information to the address query response, and transmit the address query response to the tank monitoring computer device;

transmit a sensor query request to the first sensor array;

receive a sensor query response from the second sensor array including a plurality of sensor readings from the plurality of sensors associated with the plurality of sensor arrays, wherein each sensor array of the plurality of sensor arrays includes a housing enclosing a plurality of sensors that are serially connected, wherein each sensor reading is associated with an address of a corresponding sensor of the plurality of sensors, wherein the plurality of sensor readings are readings of a plurality of surface temperatures of the tank at a plurality of points along the exterior of the tank, wherein the first sensor of the first sensor array is a first top sensor, and wherein the last sensor of the second sensor array is a last bottom sensor;

calculate a first tank level using a first method and the plurality of sensor readings, the plurality of sensor readings comprising:

a first top sensor reading including a sensor reading for a gas portion of the tank, and a last bottom sensor reading including a sensor reading for a liquid portion of the tank, wherein the plurality of sensor readings is grouped for the gas portion based on the first top sensor reading, wherein the plurality of sensor readings is grouped for the liquid portion based on the last bottom sensor reading, and wherein the plurality of sensor readings grouped for the gas portion and the plurality of sensor readings grouped for the liquid portion are used in the first method to calculate the first tank level; and report the first tank level.

15. The tank monitoring computer device of claim 14, wherein the at least one processor is further programmed to:

calculate a second tank level using a second method and the plurality of sensor readings;

compare the first tank level to the second tank level to determine a final tank level; and report the final tank level.

16. The tank monitoring computer device of claim 14, wherein the at least one processor is further programmed to:

determine a maximum value and a minimum value from the plurality of sensor readings;

compare the minimum value to the maximum value to detect a difference; and if the difference is less than a predetermined threshold, activate a heater to apply heat to the tank and request updated sensor readings from the plurality of sensors associated with the plurality of sensor arrays.

17. The tank monitoring computer device of claim 14, wherein at least one processor is further programmed to:

store a plurality of previous address information;

determine a number of sensors in the plurality of sensors has changed based on the plurality of previous address information and the address information for the plurality of sensors in the address query response; and transmit one or more alerts based on the determination.

18. The tank monitoring computer device of claim 14, wherein the plurality of sensor arrays includes a plurality of magnets, wherein the plurality of sensor arrays is configured to be attached to the tank by the plurality of magnets, and wherein a magnet of the plurality of magnets is associated with each sensor of the plurality of sensors to thermally attach to the corresponding sensor to the tank.

19. A method of externally monitoring a tank level, the method implemented by a tank monitoring computer device comprising at least one processor in communication with at least one memory device, the tank monitoring computer device in communication with a plurality of sensor arrays each including a plurality of sensors externally attached to a side of a tank, wherein the method comprises:

transmitting a sensor query request to a first sensor array of the plurality of sensor arrays, wherein the plurality of sensor arrays includes the first sensor array and a second sensor array, wherein the tank monitoring computer device is serially connected to the first sensor array, wherein the second sensor array is a last sensor array of the plurality of sensor arrays;

receiving a sensor query response from the second sensor array including a plurality of sensor readings from the plurality of sensors associated with the plurality of sensor arrays, wherein each sensor array of the plurality of sensor arrays includes a housing enclosing a plurality of sensors that are serially connected, wherein the plurality of sensors includes a first sensor and a last sensor, wherein the plurality of sensors are serially connected from the first sensor to the last sensor, wherein the first sensor array is serially connected to the second sensor array, wherein the first sensor of the first sensor array is a first top sensor, wherein the last sensor of the second sensor array is a last bottom sensor; and wherein the plurality of sensor readings are readings of a plurality of surface temperatures of the tank at a plurality of points along the exterior of the tank;

calculating a first tank level using a first method and the plurality of sensor readings, the plurality of sensor readings comprising:

a first top sensor reading including a sensor reading for a gas portion of the tank, and a last bottom sensor reading including a sensor reading for a liquid portion of the tank wherein the plurality of sensor readings is grouped for the gas portion based on the first top sensor reading, wherein the plurality of sensor readings are grouped for the liquid portion based on the last bottom sensor reading, and wherein the plurality of sensor readings grouped for the gas portion and the plurality of sensor readings grouped for the liquid portion are used in the first method to calculate the first tank level; and reporting the first tank level.

20. The method of claim 19 further comprising:

receiving, by the first sensor array, the sensor query request from the tank monitoring computer device;

collecting, by the first sensor array, a first plurality of sensor readings from the plurality of sensors in the first sensor array;

creating, by the first sensor array, the sensor query response with the first plurality of sensor readings; and transmitting, by the first sensor array, the sensor query response to an attached sensor array of the plurality of sensors arrays;

receiving, by the attached sensor array, the sensor query response from the first sensor array, wherein the sensor query response includes a plurality of sensor readings including sensor readings from the first sensor array;

collecting, by the attached sensor array, a second plurality of sensor readings from the plurality of sensors in the attached sensor array;

appending, by the attached sensor array, the second plurality of sensor readings to the sensor query response; and transmitting, by the attached sensor array, the sensor query response to the second sensor array;

receiving, by the second sensor array, the sensor query response from the attached sensor array, wherein the sensor query response includes a plurality of sensor readings including sensor readings from the first sensor array and the attached sensor array;

collecting, by the second sensor array, a third plurality of sensor readings from the plurality of sensors in the second sensor array;

appending, by the second sensor array, the third plurality of sensor readings to the sensor query response;

determining, by the second sensor array, that the second sensor array is the last sensor array of the plurality of sensor arrays; and transmitting, by the second sensor array, the sensor query response to the tank monitoring computer device.

\* \* \* \* \*